US009653000B2

(12) United States Patent
Wee (10) Patent No.: US 9,653,000 B2
(45) Date of Patent: May 16, 2017

(54) METHOD FOR PROVIDING FOREIGN LANGUAGE ACQUISITION AND LEARNING SERVICE BASED ON CONTEXT AWARENESS USING SMART DEVICE

(71) Applicant: Joon Sung Wee, Seoul (KR)

(72) Inventor: Joon Sung Wee, Seoul (KR)

( * ) Notice: Subject to any disclaimer, the term of this patent is extended or adjusted under 35 U.S.C. 154(b) by 0 days.

(21) Appl. No.: 14/362,718

(22) PCT Filed: Dec. 6, 2012

(86) PCT No.: PCT/KR2012/010584
§ 371 (c)(1),
(2) Date: Aug. 27, 2014

(87) PCT Pub. No.: WO2013/085320
PCT Pub. Date: Jun. 13, 2013

(65) Prior Publication Data
US 2015/0010889 A1 Jan. 8, 2015

(30) Foreign Application Priority Data

Dec. 6, 2011 (KR) ........................ 10-2011-0129821

(51) Int. Cl.
| G06F 17/00 | (2006.01) |
| G09B 19/06 | (2006.01) |
| G06F 17/28 | (2006.01) |
| G09B 5/06 | (2006.01) |
| G06Q 10/10 | (2012.01) |

(52) U.S. Cl.
CPC .......... *G09B 19/06* (2013.01); *G06F 17/289* (2013.01); *G06Q 10/109* (2013.01); *G09B 5/065* (2013.01)

(58) Field of Classification Search
CPC .... G06Q 10/109; G06F 17/289; G09B 19/06; G09B 5/065
See application file for complete search history.

(56) References Cited

U.S. PATENT DOCUMENTS 5,540,589 A * 7/1996 Waters ..................... G09B 5/04
434/118
9,251,144 B2 * 2/2016 Du ......................... G06F 3/0488
(Continued)

FOREIGN PATENT DOCUMENTS

| KR | 10-2006-0109567 A | 10/2006 |
| KR | 10-2007-0058857 A | 6/2007 |
(Continued)

OTHER PUBLICATIONS

Edge, Darren et al., MicroMandarin: Mobile Language Learning in Context, May 7-12, 2011, ACM.*
(Continued)

*Primary Examiner* — Nathan Hillery
(74) *Attorney, Agent, or Firm* — Jefferson IP Law, LLP (57) ABSTRACT

According to the method of the present invention for providing a foreign language acquisition and learning service based on context awareness by using a smart device, a service provider server receives user information from a user terminal, extracts foreign language learning content by using the user information, and transmits same to the user terminal, thereby providing the foreign language learning content that is tailored to the context of the user and the information of the user.

16 Claims, 7 Drawing Sheets

(56) References Cited

U.S. PATENT DOCUMENTS

| | | | | |
|---|---|---|---|---|
| 2004/0051680 A1* | 3/2004 | Azuma | G03B 13/28 | 345/8 |
| 2005/0048449 A1* | 3/2005 | Marmorstein | G09B 19/06 | 434/157 |
| 2005/0053900 A1* | 3/2005 | Kaufmann | G09B 19/06 | 434/169 |
| 2005/0089828 A1* | 4/2005 | Ayaz | G09B 19/06 | 434/157 |
| 2005/0181347 A1* | 8/2005 | Barnes | G09B 19/06 | 434/350 |
| 2005/0203727 A1* | 9/2005 | Heiner | H04W 4/02 | 704/2 |
| 2005/0288943 A1* | 12/2005 | Wei | G06F 17/289 | 358/1.15 |
| 2006/0293893 A1* | 12/2006 | Horvitz | G10L 15/1822 | 704/251 |
| 2007/0035562 A1* | 2/2007 | Azuma | G03B 13/28 | 345/633 |
| 2007/0050191 A1* | 3/2007 | Weider | G06F 17/30864 | 704/275 |
| 2008/0131851 A1* | 6/2008 | Kanevsky | G09B 19/06 | 434/157 |
| 2009/0048821 A1* | 2/2009 | Yam | G06F 3/0486 | 704/3 |
| 2009/0053681 A1* | 2/2009 | Shen | G09B 19/06 | 434/157 |
| 2009/0099836 A1* | 4/2009 | Jacobsen | G06F 17/289 | 704/3 |
| 2010/0023320 A1* | 1/2010 | Di Cristo | G06F 17/273 | 704/9 |
| 2010/0030549 A1* | 2/2010 | Lee | G06F 1/1626 | 704/4 |
| 2010/0198579 A1* | 8/2010 | Cunnington | H04L 12/1822 | 704/3 |
| 2010/0223212 A1* | 9/2010 | Manolescu | G06Q 10/06 | 706/12 |
| 2010/0227632 A1* | 9/2010 | Bell | H04L 12/1859 | 455/466 |
| 2010/0250231 A1* | 9/2010 | Almagro | G06F 17/289 | 704/2 |
| 2010/0304343 A1* | 12/2010 | Bucalo | G09B 5/065 | 434/157 |
| 2011/0060807 A1* | 3/2011 | Martin | G06F 17/3087 | 709/217 |
| 2011/0090253 A1* | 4/2011 | Good | G06F 17/289 | 345/633 |
| 2012/0015333 A1* | 1/2012 | Self | G09B 5/062 | 434/167 |
| 2012/0088543 A1* | 4/2012 | Lindner | G06F 17/289 | 455/556.1 |
| 2012/0089635 A1* | 4/2012 | Elchik | G06F 17/30669 | 707/769 |
| 2012/0092329 A1* | 4/2012 | Koo | G06K 9/3258 | 345/419 |
| 2012/0116728 A1* | 5/2012 | Shear | G06F 17/50 | 703/1 |
| 2012/0330646 A1* | 12/2012 | Andrade | G06F 17/289 | 704/7 |
| 2013/0004068 A1* | 1/2013 | Koo | G06F 17/289 | 382/165 |
| 2013/0197907 A1* | 8/2013 | Burke | G10L 15/22 | 704/231 |
| 2013/0262365 A1* | 10/2013 | Dolbear | G06N 5/02 | 706/47 |
| 2014/0272821 A1* | 9/2014 | Pitschel | G09B 19/06 | 434/157 |

FOREIGN PATENT DOCUMENTS

| | | |
|---|---|---|
| KR | 10-2010-0045637 A | 5/2010 |
| KR | 10-2011-0065860 A | 6/2011 |

OTHER PUBLICATIONS

Cui, Yanchun et al. "Context and learner modelling for the mobile foreign language learner." System 33.2 (2005), pp. 353-367.*

Al-Mekhlafi, Khalil, et al. "An approach to context-aware mobile Chinese language learning for foreign students." Mobile Business, 2009. ICMB 2009. Eighth International Conference on. IEEE, 2009.*

Thornton, Patricia & Houser, Chris; Using mobile phones in English education in Japan; Blackwell Publishing Ltd © 2005 Journal of Computer Assisted Learning 21, pp. 217-228 217.*

Thornton, Patricia & Houser, Chris; Using Mobile Phones in Education; Proceedings of the The 2nd IEEE International Workshop on Wireless and Mobile Technologies in Education (WMTE'04) © 2004 IEEE.*

Podnar, et al.; Mobile Push: Delivering Content to Mobile Users; Proceedings of the 22 nd International Conference on Distributed Computing Systems Workshops (ICDCSW'02); © 2002 IEEE.*

Kim, SeungJun, et al., Simulated Augmented Reality Windshield Display as a Cognitive Mapping Aid for Elder Driver Navigation, CHI 2009, Apr. 4-9, 2009, Boston, Massachusetts, USA. Copyright 2009 ACM, pp. 133-142.*

Fragoso, Victor, et al., TranslatAR: A Mobile Augmented Reality Translator, University of California, Santa Barbara, © 2010 IEEE, pp. 497-502.*

* cited by examiner

METHOD FOR PROVIDING FOREIGN LANGUAGE ACQUISITION AND LEARNING SERVICE BASED ON CONTEXT AWARENESS USING SMART DEVICE

TECHNICAL FIELD

The present invention relates to a method of providing a foreign language acquisition and learning service and, more particularly, to a method of providing a context awareness-based foreign language acquisition and learning service using a smart device.

BACKGROUND ART

With rapid globalization, the importance of foreign language acquisition and learning has been gradually increasing. In particular, since the importance of English as a global communication means has increased, communication-centric education has been emphasized in English education, and a conventional written language-centric education has transformed into an approach that emphasizes both written language and spoken language.

The need for the teaching of English that can be utilized in real life has arisen. In order to effectively develop the ability of students to use practical English, native English teachers were deployed to teach at primary and secondary schools. The speaking and listening education of a foreign language has become more important, as can be seen from the cases where practical English-centric education has been implemented in the many universities and universities that each invite tens of English Native professors and then provide English education have appeared.

It is frequently said that the most effective way to learn a foreign language is to go to the country where the target language is used and learn the language while living there. With the growing importance of learning a foreign language, language learning abroad has recently become an essential part of education for college students, and now younger elementary or middle school students are also going abroad for foreign language education during their vacations or going abroad to study for long periods. Furthermore, some language institutes restrict their students to using only a foreign language within the institutes in order to force the students to use the foreign language in an environment in which the foreign language is required in daily life.

Thanks to the development of information and communication technology including the Internet, foreign language education via distance education has recently been actively conducted, and is expected to be increasingly accelerated. Furthermore, thanks to the rapid popularization of smart devices, various foreign language education services provided in the form of applications for smart devices have been commercialized. However, a service that is provided using a smart device so that a user can have an experience in which he or she feels as if he or she acquired a foreign language while living in a foreign country in his or her normal daily life has not yet been developed.

DISCLOSURE

Technical Problem

Accordingly, the present invention has been made keeping in mind the above problems of the conventional methods, and an object of the present invention is to provide a method of providing a context awareness-based foreign language acquisition and learning service using a smart device, in which a service provision server receives user information from a user terminal, extracts foreign language learning content using user context information and the user information, and transmits the extracted foreign language learning content to the user terminal, thereby being able to provide user customized foreign language learning content suitable for user context and user information to a user.

Another object of the present invention is to provide a method of providing a context awareness-based foreign language acquisition and learning service using a smart device, which provides context awareness-based foreign language learning content suitable for user context in the daily life of a user, thereby enabling the user to naturally experience a foreign language in his or her daily life, enabling the user to learn, in real time, content suitable for the context in which he or she is situated and thus maximizing acquisition and learning effects, and allowing the user to be continuously and repeatedly exposed to various content in accordance with context and thus improving acquisition and learning effects, and which outputs foreign language learning content using the augmented reality, virtual reality and various multimedia functions of a smart device, thereby stimulating the interest of the user.

Technical Solution

In order to accomplish the above object(s), the present invention provides a method of providing a context awareness-based foreign language acquisition and learning service using a smart device, the method including:

(1) receiving, by a service provision server, user information from a user terminal;

(2) extracting foreign language learning content using at least any one of context information of a user and the received user information; and (3) transmitting the extracted foreign language learning content to the user terminal;

wherein the user terminal is a smart device on which an application program for receiving and outputting the foreign language learning content has been installed.

Preferably, the user information may include the age, gender, vocation, foreign language level, hobby or field of interest of the user.

Preferably, the context information may include time information, season information, weather information, issue information, theme information, event information received from the user terminal, surrounding environment information, emotion information or location information received from the user terminal.

Preferably, step (1) may include further receiving setting information from the user terminal; and step (2) may include extracting the foreign language learning content further using the setting information.

More preferably, the setting information may include the times and frequency at which the foreign language learning content is transmitted at step (3), or a degree of difficulty, quantity, type or content of the foreign language learning content.

Preferably, step (3) may include transmitting the foreign language learning content in a push fashion.

Preferably, step (3) may include transmitting the foreign language learning content using augmented reality, virtual reality or multimedia.

Preferably, the method may further include, before step (2), the step of receiving event information from a scheduler of the user in response to a request from the user terminal; and step (2) may include the step of extracting the foreign language learning content using the received event information as the context information;

More preferably, the scheduler of the user may be a scheduler that operates in conjunction with the service provision server in response to a request from the user terminal.

Advantageous Effects

In accordance with the method of providing a context awareness-based foreign language acquisition and learning service using a smart device proposed by the present invention, the service provision server receives user information from the user terminal, extracts foreign language learning content using user context information and the user information, and transmits the extracted foreign language learning content to the user terminal, thereby being able to provide user customized foreign language learning content suitable for user context and user information to a user.

Furthermore, in accordance with the present invention, context awareness-based foreign language learning content suitable for user context is provided in the daily life of a user, thereby enabling the user to naturally experience a foreign language in his or her daily life, enabling the user to learn, in real time, content suitable for the context in which he or she is situated and thus maximizing acquisition and learning effects, and allowing the user to be continuously and repeatedly exposed to various content in accordance with context and thus improving acquisition and learning effects, and foreign language learning content is output using augmented reality, virtual reality and various multimedia functions of a smart device, thereby stimulating the interest of the user.

DESCRIPTION OF REFERENCE NUMERALS

100: service provision server
110: database
200: user terminal
S100: receive user information from user terminal
S200: receive event information from scheduler of user
S300: extract foreign language learning content
S400: transmit extracted foreign language learning content to user terminal

BEST MODE

Preferred embodiments are described in detail below with reference to the accompanying diagrams so that those having ordinary knowledge in the art to which the present invention pertains can easily practice the present invention. In the detailed description of the preferred embodiments of the present invention, detailed descriptions of known functions and configurations are omitted if the detailed descriptions are deemed to make the gist of the present invention unnecessarily obscure. Furthermore, the same reference numerals are assigned to components having similar functions and operation throughout the drawings.

In addition, throughout the specification, when a component is described as being connected to another component, this includes not only the case of being "directly connected" but also the case of being "indirectly connected" with a third component interposed therebetween. Furthermore, if a component is described as "comprising" or "including" another component, this implies that the former component includes other components rather than excluding other components unless otherwise clearly contradicted by context.

Figure 1:
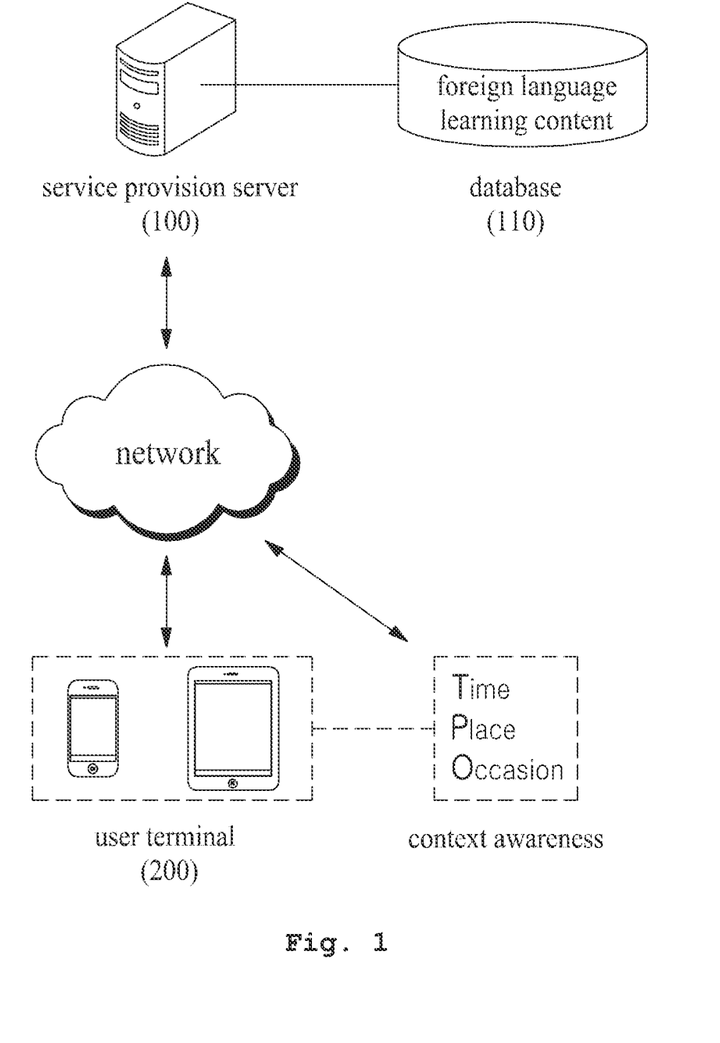
FIG. 1 is a diagram illustrating the configuration of a system for implementing a method of providing a context awareness-based foreign language acquisition and learning service using a smart device according to an embodiment of the present invention.

FIG. 1 is a diagram illustrating the configuration of a system for implementing a method of providing a context awareness-based foreign language acquisition and learning service using a smart device according to an embodiment of the present invention. As illustrated in FIG. 1, the system for implementing a method of providing a context awareness-based foreign language acquisition and learning service using a smart device according to this embodiment of the present invention may be configured to include a service provision server 100 and a user terminal 200.

That is, in accordance with the present invention, the service provision server 100 receives user information from the user terminal 200, extracts foreign language learning content using user context information and user information, and transmits the extracted foreign language learning content to the user terminal 200, thereby being able to provide user customized foreign language learning content suitable for user context and user information to the user. As described above, context awareness-based foreign language learning content suitable for context, such as time, place, and occasion (TPO), is provided in the daily life of the user, thereby maximizing a learning effect via content suitable for context in which the user is situated. Furthermore, various types of content are continuously and repeatedly transmitted in accordance with context, thereby being able to improve acquisition and learning effects. In the following, individual components of the system for implementing a method of providing a context awareness-based foreign language acquisition and learning service using a smart device according to this embodiment of the present invention are described in detail.

The service provision server 100 is a server that provides a foreign language acquisition and learning service. The service provision server 100 may allow the access of the user terminal 200 using a network including the Internet, an intranet, a wired/wireless communication network, and a mobile communication network, and may store foreign language learning content composed of various media in a database 110. The service provision server 100 may receive context information from the user terminal 200, may autonomously collect context information, or may receive event information using a user's scheduler, operating in conjunction with the service provision server 100, in response to a request from the user. The service provision server 100 extracts foreign language learning content from the database 110 using such context information, event information or user information, and transmits the extracted foreign language learning content to the user terminal 200, thereby providing user context awareness-based foreign language learning content.

The user terminal 200 is a user terminal that enables the learning of a foreign language using the context awareness-based method of providing a foreign language acquisition and learning service that is provided by the service provision server 100. The user may input user information into the service provision server 100, may receive customized foreign language learning content suitable for user information and user context information, and may then learn a foreign language. The user terminal 200 may be a terminal that is capable of outputting text, a voice, a moving image, animation and multimedia and using a global positioning system (GPS).

Meanwhile, the user terminal 200 of the present invention may be a smart device. The smart device refers to a product in which functions are not limited but can be considerably changed or expanded via application programs. The user terminal 200 of the present invention may be a smart device capable of being easily carried, such as a smart phone, a tablet PC, or the like. However, the user terminal 200 of the present invention is not limited to the forms of the enumerated terminals Any terminal may function as the user terminal 200 of the present invention regardless of its specific form as long as the terminal can access the service provision server 100 over a network and then receive foreign language learning content suitable for user context.

Alternatively, the user terminal 200 may be a smart device on which an application program for receiving and outputting foreign language learning content provided by the service provision server 100 has been installed. When such an application program is installed and executed, an interface for making it convenient to transmit and receive various types of data and signals to and from the service provision server 100 can be provided, and foreign language learning content provided by the service provision server 100 can be conveniently received and learned.

Figure 2:
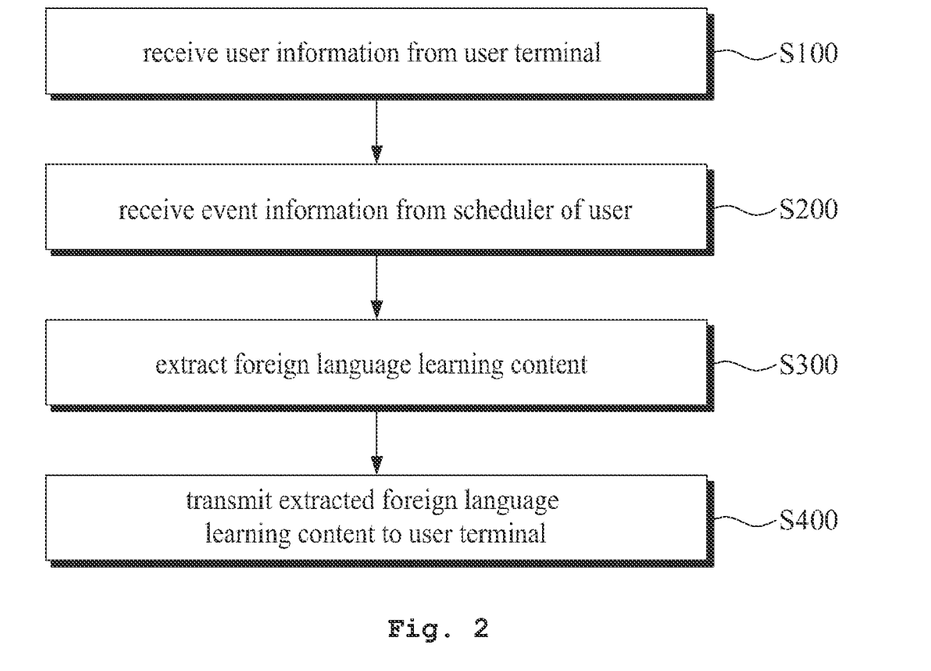
FIG. 2 is a diagram illustrating the flow of a method of providing a context awareness-based foreign language acquisition and learning service using a smart device according to an embodiment of the present invention.

FIG. 2 is a diagram illustrating the flow of a method of providing a context awareness-based foreign language acquisition and learning service using a smart device according to an embodiment of the present invention. As illustrated in FIG. 2, the method of providing a context awareness-based foreign language acquisition and learning service using a smart device according to an embodiment of the present invention may be implemented to include step S100 of receiving user information from the user terminal 200, step S300 of extracting foreign language learning content, and step S400 of transmitting the extracted foreign language learning content to the user terminal 200, and may be implemented to further include step S200 of receiving event information from the scheduler of a user.

At step S100, the service provision server 100 may receive user information from the user terminal 200. In this case, the user information may include the user's age, gender, vocation, foreign language level, hobby, field of interest or character. Using such user information, user customized foreign language learning content may be provided to the user. That is, using user information, different pieces of foreign language learning content may be provided to an adult male and a teenage female despite the same context.

Meanwhile, at step S100, setting information may be further received from the user terminal 200. In this case, the setting information may include the times and frequency at which foreign language learning content is transmitted at step S400, which will be described in detail below, the degree of difficulty, quantity, type or content of the foreign language learning content. The type of foreign language learning content may include content using various types of multimedia, such as text, images and a moving image, content using virtual reality, and content using augmented reality.

At step S200, the service provision server 100 may receive event information from the scheduler of the user. In this case, the scheduler of the user may be a scheduler that operates in conjunction with the service provision server 100 in response to a request from the user terminal 200. The scheduler of the user may be a scheduler that is stored in the user terminal 200 including a scheduler function. Furthermore, in the case of a user who uses an on-line scheduler service, the service provision server 100 may receive event information from a user account of the on-line scheduler service.

At step S300, the service provision server 100 may extract foreign language learning content using user context information and the user information received at step S100. The context information may include time information, season information, weather information, issue information, theme information, event information received from the user terminal 200, surrounding environment information, emotion information or location information received from the user terminal 200. In this case, the service provision server 100 may collect time information about time or a date from itself; and may receive information about weather or traffic context from an external server or from a service administrator. Furthermore, issue information, such as a K-pop craze or a stock market crash, and theme information, such as the vacation season, the entrance exam season, the graduation season or Valentine Day, may be received from a service administrator in real time. Meanwhile, since a user event, surrounding environment information, emotion, and location correspond to the special context of the user, they may be collected from the user terminal 200. In particular, the location information may be received using the GPS of the user terminal 200, and the surrounding environment information may be received via the camera or sensor of the user terminal 200. However, when the event information is received from the scheduler of the user at step S200, foreign language learning content may be extracted using the received event information. In this case, at step S300, foreign language learning content suitable for user context may be extracted by searching stored foreign language learning content in the database 110, or may be generated by combining multiple pieces of content in accordance with user context information and user information.

For example, when a user who is an office worker is on his or her way to work, it may be possible to extract foreign language learning content corresponding to a theme related to weather information or traffic information. In the Christmas season, foreign language learning content related to Christmas may be extracted. When location information received from the user terminal 200 corresponds to a location near a department store, a dialogue that may take place between a salesclerk and a customer in a department store during shopping may be extracted as foreign language learning content. Furthermore, foreign language learning content may include content related to the emotion or sensation of a user. Accordingly, during the weekend when weather is fine, foreign language learning content related to happy emotions may be extracted. When location information received from the user terminal 200 corresponds to a location near a street where restaurants are located, foreign language learning content related to an expression regarding the taste of food may be extracted. For this purpose, the service provision server 100 may arrange foreign language learning content according to their point of interest (POI) and then store it in the database 110.

Meanwhile, at step S300, foreign language learning content may be extracted using setting information received at step S100. That is, at step S300, foreign language learning content suitable for time, frequency, strength, and the quantity and type of foreign language learning content set by the user is extracted, and thus an appropriate quantity of foreign language learning content can be extracted so that the user can be continuously exposed to a foreign language at his or her convenient time. As described above, foreign language learning content is extracted using setting information, thereby improving the learning efficiency of the user.

At step S400, the service provision server 100 may transmit the extracted foreign language learning content to the user terminal 200. The service provision server 100 may transmit foreign language learning content to the user terminal 200 over a network, in which case the transmitted foreign language learning content may be content composed of various media, such as text, images, sound, a moving image, multimedia, and the like. Furthermore, at step S400, foreign language learning content may be transmitted using augmented reality, virtual reality or multimedia. Augmented reality, virtual reality, and various types of multimedia that are usable in the smart device are used, thereby improving a learning effect by improving the user's concentration and providing amusement to the user.

In an embodiment, the total cumulative time related to the foreign language learning content transmitted to the user terminal 200 is also transmitted and displayed on the user terminal 200. Since it is known that language acquisition requires continuous exposure to a specific language for a time period equal to or longer than a specific time period, notification of a total time period for which the user has been exposed to a foreign language is provided, thereby providing foreign language learning motivation to the user.

Meanwhile, at step S400, the foreign language learning content may be transmitted in a push fashion. When the foreign language learning content is transmitted in a push fashion, the user can immediately become aware of the foreign language learning content, the user can be naturally exposed to a foreign language while he or she is performing another task. In an embodiment, the fact that the foreign language learning content has been transmitted may be transmitted using a push message. When the push message is used as described above, the user's attention is provoked, and thus the user is immediately made to check foreign language learning content. In this case, context information used in the transmitted foreign language learning content may be also contained in the push message, and thus details of content can be determined by the user at a glance.

FIGS. 3 to 7 are diagrams illustrating, by way of example, the user terminal 200 on which the received foreign language learning content has been displayed at step S400 of the method of providing a context awareness-based foreign language acquisition and learning service using a smart device according to the embodiment of the present invention. In the following, the user terminal 200 that has received foreign language learning content from the service provision server 100 and has displayed it will be described in detail with reference to FIGS. 3 to 7 using examples.

Figure 3:
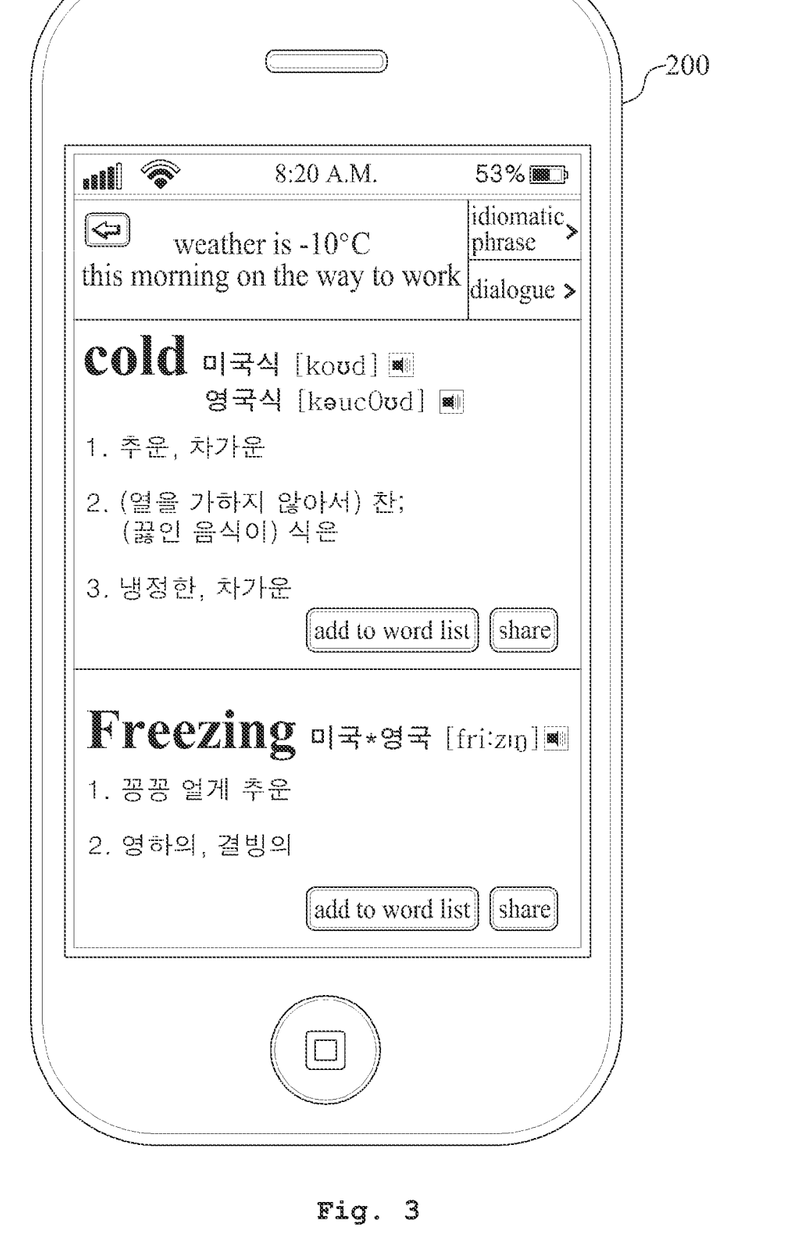
FIG. 3 is a diagram illustrating, by way of example, a user terminal to which text-type foreign language learning content has been provided in a method of providing a context awareness-based foreign language acquisition and learning service using a smart device according to an embodiment of the present invention.

FIG. 3 is a diagram illustrating, by way of example, the user terminal 200 to which text-type foreign language learning content has been provided in a method of providing a context awareness-based foreign language acquisition and learning service using a smart device according to an embodiment of the present invention. As illustrated in FIG. 3, in the present invention, the service provision server 100 may extract foreign language learning content using the fact that the user is an office worker, in addition to context information, such as time information, season information and weather information, and may transmit the extracted foreign language learning content to the user terminal 200. In this case, the context information "weather is −10° C. this morning on the way to work" is also displayed, and thus additional information may be provided to the user. A word suitable for cold weather may be provided as the foreign language learning content, and an idiomatic phrase or a dialogue using the word may be additionally provided. Furthermore, pronunciations may be heard in sound, and the user's pronunciations may be recorded using a microphone provided in the user terminal 200 and then recorded sounds may be provided.

Meanwhile, the service provision server 100 may provide a word list in accordance with a user account, thereby enabling the user to conveniently establish a word list while learning words included in foreign language learning content. Furthermore, foreign language learning content may be allowed to be transmitted to a social network service (SNS) of the user, and thus the foreign language learning content may be shared. For this purpose, the service provision server 100 may operate in conjunction with the social network service account of the user.

Figure 4:
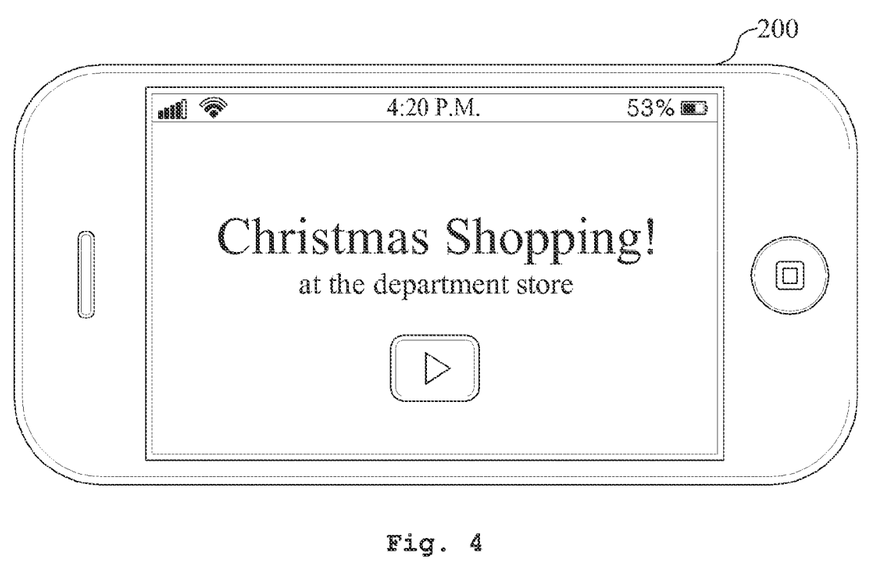
FIG. 4 is a diagram illustrating, by way of example, a user terminal to which moving image-type foreign language learning content has been provided in a method of providing a context awareness-based foreign language acquisition and learning service using a smart device according to an embodiment of the present invention.
Figure 5:
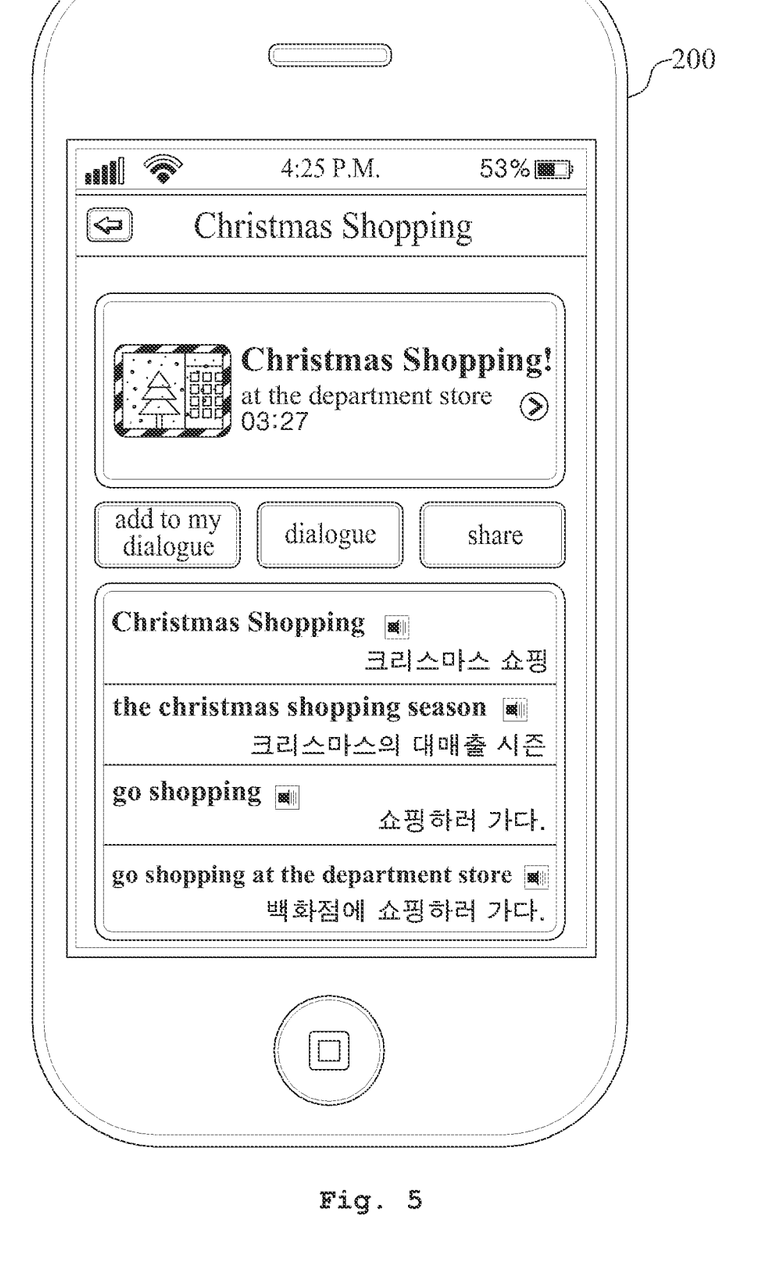
FIG. 5 is a diagram illustrating, by way of example, a user terminal to which moving image-type foreign language learning content has been provided in a method of providing a context awareness-based foreign language acquisition and learning service using a smart device according to an embodiment of the present invention.

FIGS. 4 and 5 are diagrams illustrating, by way of example, the user terminal 200 to which moving image-type foreign language learning content has been provided in a method of providing a context awareness-based foreign language acquisition and learning service using a smart device according to an embodiment of the present invention. As illustrated in FIGS. 4 and 5, in the present invention, the service provision server 100 may transmit foreign language learning content in the form of a moving image or multimedia to the user terminal 200. In this case, the service provision server 100 may transmit Christmas shopping-related foreign language learning content to the user terminal 200 of a user near a department store in the Christmas season using context information including season information or event information related to Christmas and location information received from the user terminal 200.

As illustrated in FIG. 5, the service provision server 100 may provide an expression included in moving image content in the form of text and sounds, together with foreign language learning content in the form of a moving image. Furthermore, a dialogue of a character may be provided in the form of text without requiring the repeated playback of the moving image (a "dialogue" menu option). Meanwhile, the foreign language learning content in the form of a moving image may be transmitted to the social network service of the user, and thus the foreign language learning content may be shared.

Figure 6:
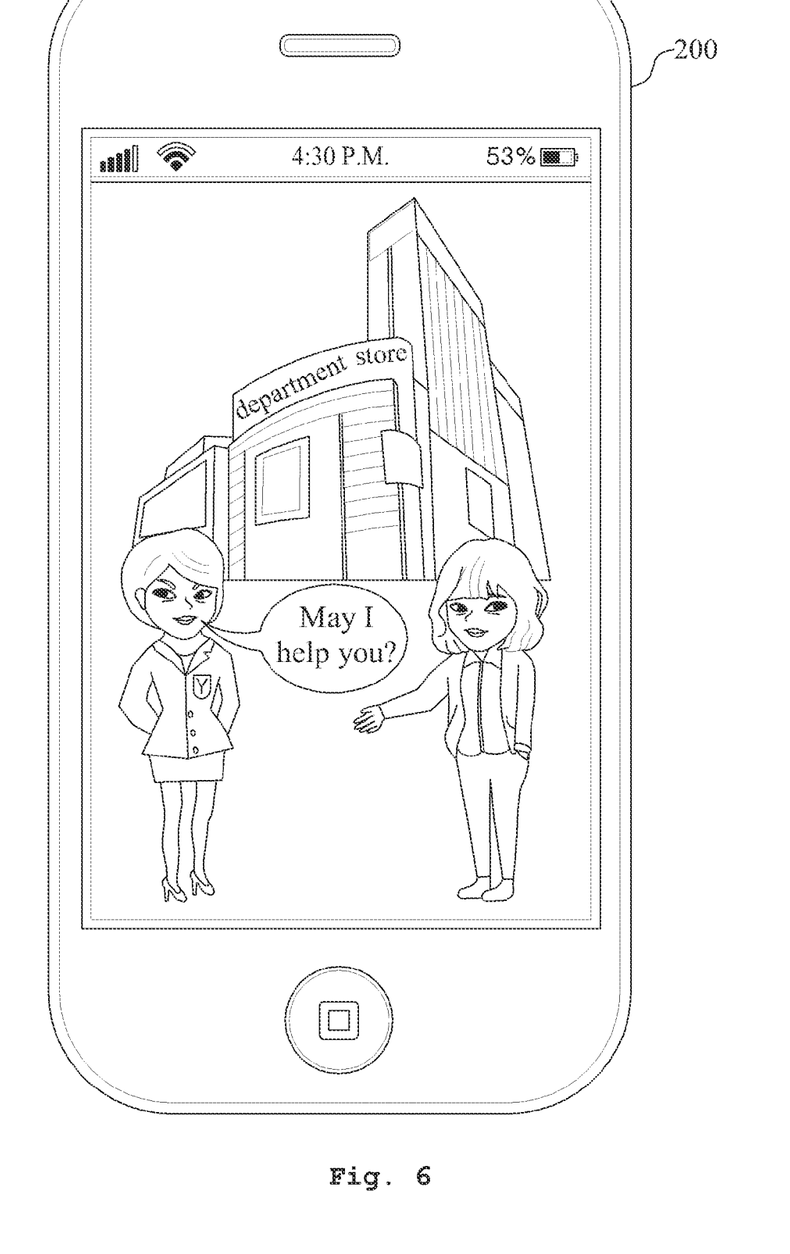
FIG. 6 is a diagram illustrating, by way of example, a user terminal to which foreign language learning content has been provided using the augmented reality function of a smart device in a method of providing a context awareness-based foreign language acquisition and learning service using a smart device according to an embodiment of the present invention.

FIG. 6 is a diagram illustrating, by way of example, the user terminal 200 to which foreign language learning content has been provided using the augmented reality function of a smart device in a method of providing a context awareness-based foreign language acquisition and learning service using a smart device according to an embodiment of the present invention. As illustrated in FIG. 6, in the present invention, the service provision server 100 may provide foreign language learning content using the augmented reality function of the smart device. Augmented reality (AR) is technology for displaying a 3D virtual object overlaid on the real world, and can be implemented in most smart devices. A building shown in FIG. 6 corresponds to an image of a reality perceived by the naked eyes of an actual user and captured using a camera provided in the user terminal 200, and characters and the content of a dialogue correspond to foreign language learning content transmitted by the service provision server 100. That is, when the location information received from the user terminal 200 by the service provision server 100 corresponds to a location near a department store, a dialogue that may take place between a salesclerk and a customer in a department store may be extracted as foreign language learning content at step S300. At step S400, the foreign language learning content extracted using the augmented reality function of the user terminal 100 may be output, thereby providing amusement to the user, enabling the user to naturally experience a foreign language in his or her real life, and improving the concentration of the user in regards to the foreign language learning content.

Figure 7:
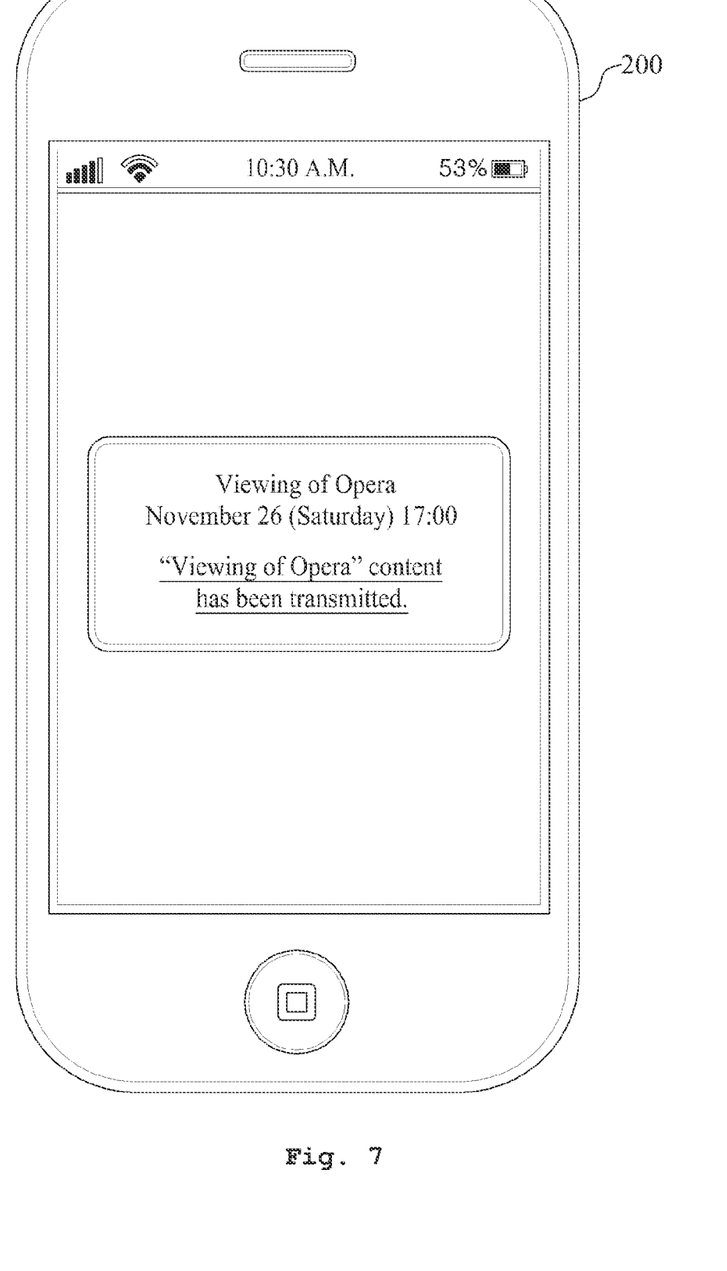
FIG. 7 is a diagram illustrating, by way of example, a user terminal on which a push message based on the transmission of foreign language learning content has been displayed in a method of providing a context awareness-based foreign language acquisition and learning service using a smart device according to an embodiment of the present invention.

FIG. 7 is a diagram illustrating, by way of example, the user terminal 200 on which a push message based on the transmission of foreign language learning content has been displayed in a method of providing a context awareness-based foreign language acquisition and learning service using a smart device according to an embodiment of the present invention. As illustrated in FIG. 7, in the present invention, the service provision server 100 may receive event information from the scheduler of a user, may extract foreign language learning content related to the event information, and may transmit the extracted foreign language learning content to the user terminal 200. That is, when event information related to the viewing of an opera is received from the scheduler of the user, the service provision server 100 may extract foreign language learning content related to a dialogue that may be made in an opera house, a dialogue that recommends a friend to view the opera along with the user, and details of the opera that is being viewed by the user, and may transmit the extracted foreign language learning content to the user terminal 200.

In this case, as illustrated in FIG. 7, notification that the foreign language learning content has been transmitted may be provided to the user by means of a push message. The event information "Viewing of Opera November 26 (Saturday) 17:00," which is context information that was used to extract foreign language learning content, may be also transmitted, thereby performing a schedule alarm function. Furthermore, as illustrated in FIG. 7, notification that the transmitted foreign language learning content relates to the "Viewing of Opera" may be provided.

Various modifications or applications may be made to the above-described present invention by those having ordinary knowledge in the technical field to which the present invention pertains, and the scope of the technical spirit according to the present invention should be defined by the following claims.

The invention claimed is:

1. A method of providing a context awareness-based foreign language acquisition and learning service using a smart mobile device, the method comprising:
   receiving, by a service provision server, user information from the smart mobile device;
   receiving, by the service provision server, real world event information from an electronic scheduler of a user of the smart mobile device in response to a request from the smart mobile device;
   generating, from electronic storage, foreign language learning content based on the received real world event information as context information of the user and using the received user information, the foreign language learning content being in a language foreign to the user;
   receiving, from the smart mobile device, setting information specifying times and frequency at which the foreign language learning content is to be transmitted to the smart mobile device,
   transmitting at the specified times and frequency, using a network, the extracted foreign language learning content as a push message to the smart mobile device, and
   presenting in real time, in a language foreign to the user, an augmented reality overlay including a 3D virtual object overlaid on a real world image, the augmented reality overlay including a plurality of characters providing foreign language learning content as an exemplary dialogue between the plurality of characters based on a current location of the user of the smart mobile device,
   wherein the plurality of characters and dialogue are overlaid on an image of the current location of the user, the image captured by a camera of the smart mobile device, and wherein the smart mobile device comprises a smart mobile device on which an application program for receiving and outputting the foreign language learning content has been installed,
   wherein the generated foreign language learning content is based on a current location of the user, and
   wherein the generated foreign language learning content is designed to be presented as a dialogue of a character presented at the smart mobile device.

2. The method of claim 1, wherein the user information comprises an age, gender, vocation, foreign language level, hobby or field of interest of the user.

3. The method of claim 1, wherein the context information comprises time information, issue information, theme information, event information received from the smart mobile device, surrounding environment information, or location information received from the smart mobile device.

4. The method of claim 1, wherein the setting information comprises a degree of difficulty, quantity, type or content of the foreign language learning content.

5. The method of claim 1, wherein the generating comprises generating the foreign language learning content for presentation via virtual reality or multimedia.

6. The method of claim 1, wherein the generating of the foreign language learning content comprises generating the foreign language learning content using the setting information.

7. The method of claim 1, wherein the push message comprises a schedule alarm notification.

8. The method of claim 1, further comprising:
transmitting, by the service provision server, at least a portion of the generated foreign language learning content to a social network service of the user.

9. The method of claim 1, wherein the generated foreign language learning content is not a translation of any foreign language input received by the smart mobile device.

10. The method of claim 1, further comprising:
transmitting a message to the smart mobile device recommending a friend of the user to join a scheduled event.

11. The method of claim 1, wherein the generated foreign language learning content comprises a word.

12. The method of claim 1, wherein the generated foreign language learning content comprises an idiomatic phrase.

13. The method of claim 1, further comprising:
receiving from the smart mobile device, an indication that a portion of the generated foreign language learning content is to be added to a word list associated with the user.

14. The method of claim 1,
wherein the augmented reality overlay is based on one or more of season information, traffic conditions, and emotion information.

15. A system for providing a context awareness-based foreign language acquisition and learning service using a smart mobile device, the system comprising:
a service provision server communicatively coupled to a network, and
a memory containing stored executable instructions,
wherein the service provision server comprises one or more computer processors which execute the stored executable instructions for:
receiving user information from the smart mobile device,
receiving real world event information from an electronic scheduler of a user of the smart mobile device in response to a request from the smart mobile device,
receiving, from the smart mobile device, setting information specifying times and frequency at which the foreign language learning content is to be transmitted to the smart mobile device,
generating, from electronic storage, foreign language learning content based on the received real world event information as context information of the user and using the received user information, the foreign language learning content being in a language foreign to the user,
transmitting at the specified times and frequency, using the network, the extracted foreign language learning content as a push message to the smart mobile device, and
presenting in real time, in a language foreign to the user, an augmented reality overlay including a 3D virtual object overlaid on a real world image, the augmented reality overlay including a plurality of characters providing foreign language learning content as an exemplary dialogue between the plurality of characters based on a current location of the user of the smart mobile device, and
wherein the plurality of characters and dialogue are overlaid on an image of the current location of the user, the image captured by a camera of the smart mobile device,
wherein the generated foreign language learning content is based on a current location of the user, and
wherein the generated foreign language learning content is designated to be presented as a dialogue of a character presented at the smart mobile device.

16. An article of manufacture for providing a context awareness-based foreign language acquisition and learning service using a smart mobile device, the article of manufacture comprising:
at least one non-transitory computer processor readable storage medium; and
instructions stored on the at least one non-transitory computer processor readable storage medium,
wherein the instructions are readable from the at least one non-transitory computer processor readable storage medium by at least one computer processor and thereby cause the at least one computer processor to operate so as to:
receive user information from the smart mobile device,
receive real world event information from an electronic scheduler of a user of the smart mobile device in response to a request from the smart mobile device,
receive, from the smart mobile device, setting information specifying times and frequency at which the foreign language learning content is to be transmitted to the smart mobile device,
generate, from electronic storage, foreign language learning content based on the received real world event information as context information of the user and using the received user information, the foreign language learning content being in a language foreign to the user,
transmit at the specified times and frequency, using a network, the extracted foreign language learning content as a push message to the smart mobile device, and
present in real time, in a language foreign to the user, an augmented reality overlay including a 3D virtual object overlaid on a real world image, the augmented reality overlay including a plurality of characters providing foreign language learning content as an exemplary dialogue between the plurality of characters based on a current location of the user of the smart mobile device, and
wherein the plurality of characters and dialogue are overlaid on an image of the current location of the user, the image captured by a camera of the smart mobile device,
wherein the generated foreign language learning content is based on a current location of the user, and
wherein the generated foreign language learning content is designated to be presented as a dialogue of a character presented at the smart mobile device.

* * * * *